United States Patent [19]
Abramson et al.

[11] Patent Number: 5,434,987
[45] Date of Patent: Jul. 18, 1995

[54] METHOD AND APPARATUS FOR PREVENTING INCORRECT FETCHING OF AN INSTRUCTION OF A SELF-MODIFYING CODE SEQUENCE WITH DEPENDENCY ON A BUFERED STORE

[75] Inventors: Jeffrey M. Abramson, Aloha; Haitham Akkary, Portland; Andrew F. Glew, Hillsboro; Glenn J. Hinton; Kris G. Konigsfeld, both of Portland; Paul D. Madland, Beaverton, all of Oreg.

[73] Assignee: Intel Corporation, Santa Clara, Calif.

[21] Appl. No.: 350,379

[22] Filed: Dec. 5, 1994

Related U.S. Application Data

[63] Continuation of Ser. No. 124,934, Sep. 21, 1993, abandoned.

[51] Int. Cl.$^6$ .............................................. G06F 9/30
[52] U.S. Cl. .................................................... 395/375
[58] Field of Search ....................... 395/375, 800, 775

[56] References Cited

U.S. PATENT DOCUMENTS

| | | | |
|---|---|---|---|
| 4,734,852 | 3/1988 | Johnson et al. | 395/250 |
| 4,750,112 | 6/1988 | Jones et al. | 395/375 |
| 4,773,041 | 9/1988 | Hassler et al. | 395/400 |
| 4,916,652 | 4/1990 | Schwarz et al. | 364/748 |
| 5,073,855 | 12/1991 | Staplin et al. | 395/375 |
| 5,125,083 | 6/1992 | Fite et al. | 395/375 |
| 5,150,470 | 9/1992 | Hicks et al. | 395/375 |
| 5,226,126 | 7/1993 | McFarland et al. | 395/375 |
| 5,251,308 | 10/1993 | Frank et al. | 395/425 |
| 5,295,249 | 3/1994 | Blaner et al. | 395/375 |

OTHER PUBLICATIONS

"The Metaflow Architecture", © 1991 IEEE, Jun. IEEE Micro, Authors: Val Popescu, Merle Schultz, John Spracklen, Gary Gibson, Bruce Lightner, David Isaman.

Primary Examiner—Parshotam S. Lall
Assistant Examiner—Viet Vu
Attorney, Agent, or Firm—Blakely, Sokoloff, Taylor & Zafman

[57] ABSTRACT

A number of identical matching circuits are integrated into the store address buffer, one matching circuit to each buffer slot, for generating a number of match signals, one for each detected match, using at most the entire source address of an instruction being fetched and the corresponding portions of the store destination addresses of the buffered store instructions. Additionally, a stall signal generator complimentary to the store address buffer is provided for generating a single stall signal for the bus controller, using the match signals, thereby stalling an instruction fetch from a source address that is potentially a store destination of one of the buffered store instructions with minimal performance cost.

24 Claims, 10 Drawing Sheets

METHOD AND APPARATUS FOR PREVENTING INCORRECT FETCHING OF AN INSTRUCTION OF A SELF-MODIFYING CODE SEQUENCE WITH DEPENDENCY ON A BUFERED STORE

This is a divisional of application Ser. No. 08/124,934, filed Sep. 21, 1993, now abandoned.

BACKGROUND OF THE INVENTION

1. Field of the Invention

The present invention relates to the field of computer systems. More specifically, the present invention relates to instruction fetching and issuing on computer systems where an instruction being fetched may be dependent on a buffered store instruction.

2. Background

It is known in the art that some computer applications employ self-modifying code sequences. A self-modifying code sequence is a sequence of instructions where a first earlier instruction is modified by a second later instruction. Thus, if the instruction sequence is to be executed multiple number of times, starting with the second iteration, the first earlier instruction of the current iteration must be executed after the second later instruction of the immediately preceding iteration, in order for the instruction sequence to be executed correctly.

A common approach employed to modify the first earlier instruction is for the second later instruction to store the modifying information into the appropriate memory locations of the first earlier instruction. Since on some computer systems, store instructions can be buffered, it is critical then under this approach that if the modifying second subsequent store instruction is buffered, the fetching and issuing of the dependent first earlier instruction be delayed or the buffered modifying information be forwarded to override the dependent operands of the first earlier instruction.

A particular example of computer systems where store instructions may be buffered is computer systems where issued instructions may be executed out-of-order. Out-of-order execution is a technique for improving execution performance of a computer system. On such a computer system, instructions are fetched and issued in order into a reservation station. Some instructions are even fetched and issued speculatively assuming their branches will be taken. The issued instructions are held in the reservation station pending resolution of their operands having dependency on the execution results of preceding instructions. The instructions are then dispatched from the reservation station to the appropriate execution units for execution as soon as their operands are resolved. The execution results of integer, floating point, and load operations are held in reorder buffers and retired/committed in order. Store instructions with the store destinations calculated are buffered, and then retired/committed in order. The retired/committed store instructions are in turn executed in "background" when it is "convenient" for the memory system. Some buffered store instructions are retired/committed and executed at the same time. Some of the speculative execution results and speculatively buffered stores wound up being discarded when it was subsequently determined that the branches were not taken. Thus, the instructions are not necessarily dispatched and executed in the order they are issued, thereby resulting in potential faster overall performance.

The data integrity and correctness of out-of-order execution clearly rely on having the execution results and buffered stores retired/committed in a proper and orderly manner, and with the inaccurately speculated execution results and buffered stores being properly purged. In addition, the data integrity and correctness of out-of-order execution also rely on inter-instruction operand dependencies being properly detected and resolved before the dependent instructions are dispatched for execution. Typically, the reservation station has the primary responsibility for detecting inter-instruction operand dependencies. However, certain inter-instruction operand dependencies are not detectable by the reservation station. A particular example is the type of dependency between the first earlier instruction and the second later instruction of self-modifying code sequence described earlier.

For example, consider a loop having two instructions where a first earlier instruction adds a constant to a first variable and a second later instruction stores the value of a second variable into the first earlier instruction modifying the constant. Starting with the second iteration, the execution of the first earlier instruction of the current iteration is dependent on the execution result of the second later instruction in the immediately preceding iteration. However, to the reservation station, the operands of the first earlier instruction always appear to be independent and resolved, and will be dispatched for execution immediately whenever it is issued the instruction. Thus, if a subsequent iteration of the loop is speculatively fetched and issued, the first earlier instruction will be incorrectly executed, unless as described earlier, it can be ensured that the fetching and issuing of the dependent first earlier instruction is after the execution of the second later store instruction of the immediately preceding iteration, or, alternatively, the modifying information is forwarded to override the dependent operand of the dependent first earlier instruction.

Thus, it is desirable to prevent incorrect fetching of an instruction of a self-modifying code sequence with dependency on a buffered store, particularly on a computer system where instructions may be executed out-of-order. It is further desirable that the prevention is achieved with minimal performance cost. As will be disclosed, the present invention provides for a method and apparatus that advantageously achieves these and other desirable results.

SUMMARY OF THE INVENTION

Under the present invention, the desirable results are advantageously achieved by integrating a number of identical matching circuits to the store address buffer, one matching circuit to each buffer slot, and additionally providing a stall signal generator complimentary to the store address buffer. The matching circuits are used to generate a number of match signals, one for each detected match, using at most the entire source address of the instruction being fetched and the corresponding portions of the store destination addresses of the buffered store instructions. The stall signal generator is used to generate a single stall signal for the bus controller, using the match signals, thereby stalling an instruction fetch from a source address that is potentially a store destination of one of the buffered store instructions with minimal performance cost.

Each matching circuit comprises a number of comparators and AND gates. The comparators are used to match the corresponding portions of the source address of the instruction being fetched and the store destination address of a particular buffered store instruction. The AND gates are used to generate the match signal for the particular buffered store instruction based on the matching results of their corresponding comparators and the state of the validity bit of the particular buffered store instruction.

In one embodiment, the stall signal generator comprises a pre-charged bit line, an inverter, and an AND gate. The pre-charged bit line and the inverter are used to generate a single combined match signal based on the match signals generated by the matching circuits. The AND gate is used to generate the single stall signal based on the combined match signal and the state of the bus request validity signal.

Additionally, in an embodiment where each store destination address of a buffered store instruction is a physical address comprising a memory page denoting portion and a page offset denoting portion, and the two portions are stored separately in a complimentary buffer in the data cache and the store address buffer, a partial address field is provided to each buffered store instruction entry in the store address buffer for storing a predetermined number of the lower order address bits of the page denoting portion of the physical address. Under this embodiment, the matching circuits generate the match signals using only the lower order address bits of the page denoting portion and a predetermined number of high order address bits of the page offset denoting portion of the physical addresses.

Furthermore, in an embodiment where memory references may span two cache lines, a subtractor complimentary to the store address buffer is also provided for generating an adjusted source address by subtracting the cache line size from the source address of the instruction being fetched. Each of the matching circuits is provided with additional comparators to address match the corresponding portions of the adjusted source address and the store destination address of the particular buffered store instruction, and an OR gate to allow the matching circuit to generate a match signal when a match is detected with either the adjusted or unadjusted source address of the instruction being fetched.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
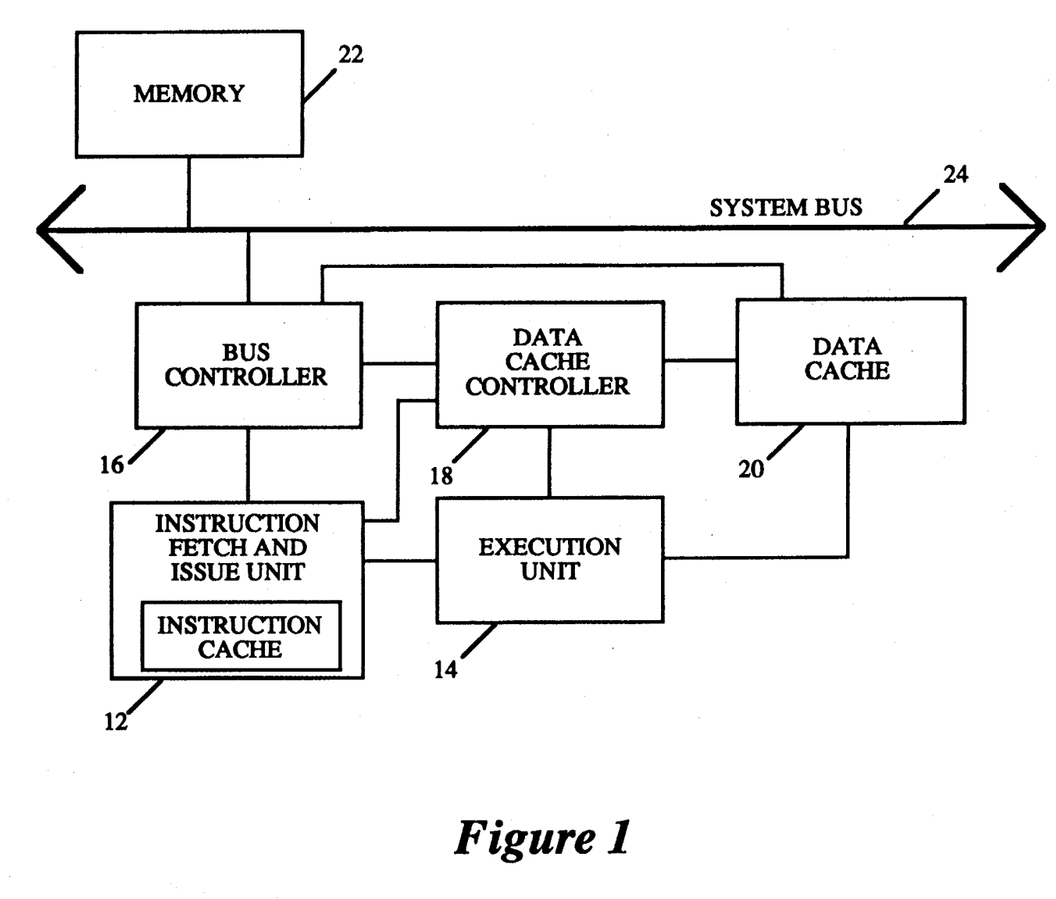
FIG. 1 illustrates an exemplary computer system incorporating the teachings of the present invention.

Referring now to FIG. 1, a block diagram illustrating an exemplary computer system incorporating the teachings of the present invention is shown. The exemplary computer system 10 comprises an instruction fetch and issue unit 12 with an integrated instruction cache, an execution unit 14, a bus controller 16, a data cache controller 18 incorporated with the teachings of the present invention, a data cache 20, a memory unit 22, and a system bus 24. The elements 12–24 are coupled to each other as illustrated. The exemplary computer system is diposed on a single silicon chip. Together they cooperate to fetch, issue, execute, and save execution results of instructions in a pipelined manner.

The instruction fetch and issue unit 12 fetches instructions from the memory unit 22 through the bus controller 16 and the system bus 24, and issues them in order to the execution unit 14. Some instructions are fetched and issued speculatively. The execution unit 14 holds and executes the integer and floating point instructions as soon as their operand dependencies on execution results of preceding instructions are resolved, including those integer and floating point instructions that are speculatively fetched and issued. Similarly, the execution unit 14 holds and forwards the load and store instructions to the data cache controller 18 as soon as their operand dependencies on execution results of preceding instructions are resolved, including those load and store instructions that are speculatively fetched and issued. The data cache controller 18 and the data cache 20 respond to the load instructions immediately, forwarding data if necessary, whereas, the store instructions are buffered. In other words, the instructions are not necessarily executed/forwarded in the order they were issued, and some instructions are speculatively executed/forwarded. However, the execution results of the integer, floating point, and load instructions are buffered, and then retired or committed in order, whereas the buffered store instructions are retired or committed in order, and then executed in "background" at the convenience of the memory system. Speculative integer, floating point, and load execution results and buffered stores of mis-predicted branches are purged.

Figure 10:
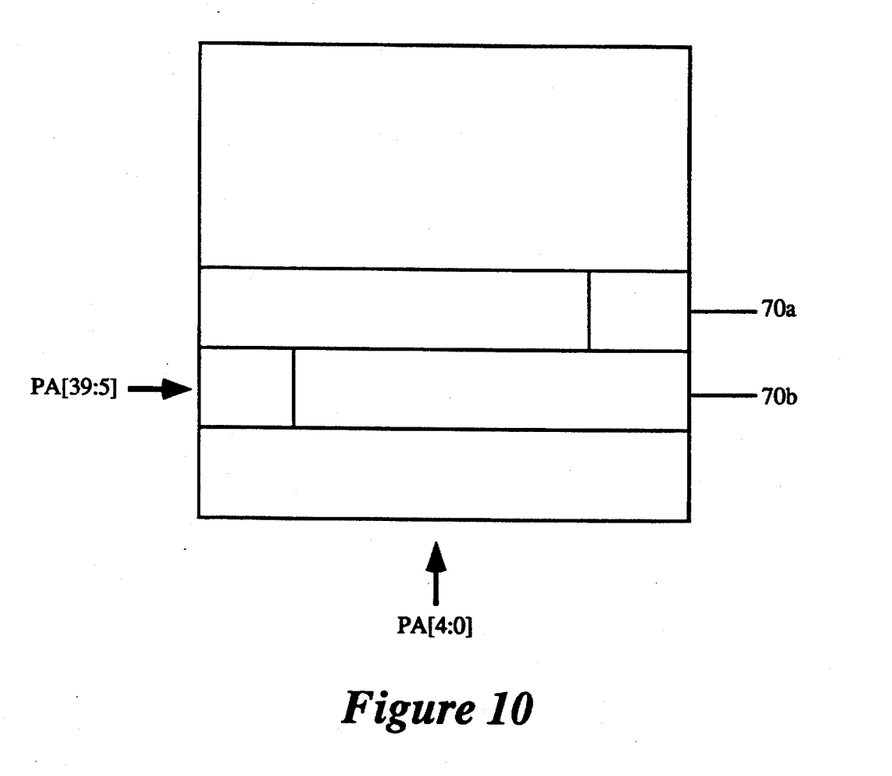
FIG. 10 illustrates an exemplary instruction fetch from memory locations spanning two instruction cache lines.

The instruction fetch and execution unit 12 is intended to represent a broad category of instruction fetching and issuing elements found in many computer systems. Their constitutions and functions are well known and will not be further described. In the presently preferred embodiment, the instruction fetch and issue unit 12 uses the data cache controller 18 for page miss handling. Furthermore, there is no requirement for the instructions to be fetched from aligned memory locations. In other words, an instruction may be fetched from memory locations spanning two cache lines (see FIG. 10). However, based on the descriptions to follow, it will be appreciated that the present invention may be practiced with or without an instruction cache, or with a combined instruction/data cache, and if there is an instruction cache, page misses may be handled by a dedicated page miss handler, and instructions may be fetched from aligned memory locations only.

The bus controller 16, the system bus 24, and the memory 22, are also intended to represent a broad category of these elements found in most computer systems. Their functions and constitutions are well known and will not be further described. The execution unit 14, the data cache controller 18 incorporated with the teachings of the present invention, and the data cache 20 will be described in further detail below with additional references to the remaining figures.

While for the ease of explanation, the present invention is being described with an exemplary computer system coupled in the illustrated manner and disposed on a single silicon chip, based on the descriptions to follow, it will be appreciated that the present invention may be practiced on computer systems of any number of architecture disposed on any number of chips, or integrated with any number of semiconductor materials.

Figure 2:
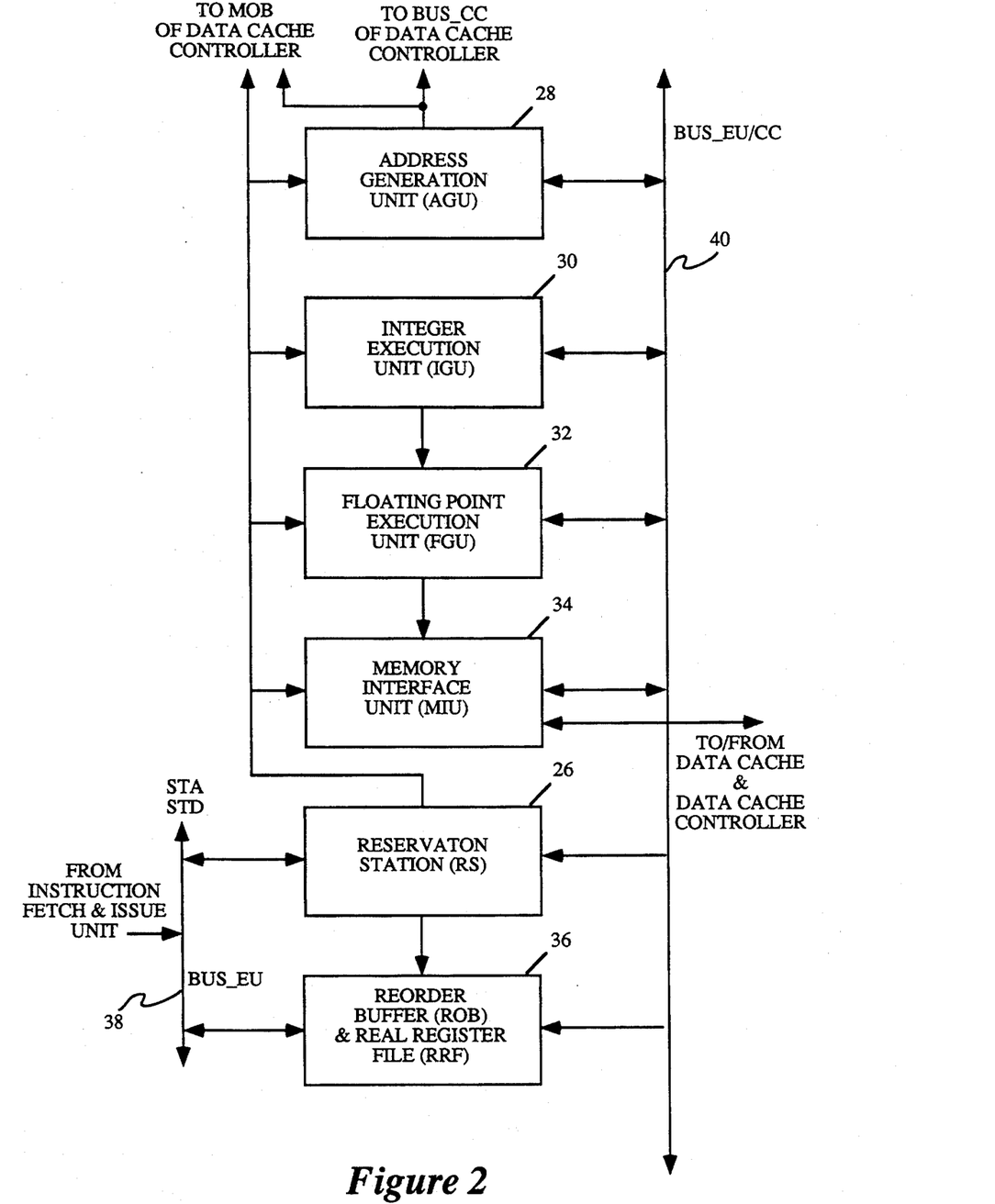
FIG. 2 illustrates the relevant portions of one embodiment of the execution unit of FIG. 1 in further detail.

Referring now to FIG. 2, a block diagram illustrating the relevant portions of one embodiment of the execution unit of FIG. 1 in further detail is shown. In this embodiment, the execution unit 14 comprises a reservation station (RS) 26, an address generation unit (AGU) 28, an integer execution unit (IEU) 30, a floating point execution unit (FEU) 32, a memory interface unit (MIU) 34, and a reorder buffer (ROB) and real register file (RRF) 36. Additionally, the execution unit 14 comprises an internal bus (Bus_EU) 38 and a common bus (Bus_EU/CC) 40 shared with the data cache controller. These elements 26–40 are coupled with each other as illustrated. Together, they hold, dispatch, execute, and retire/commit execution results of instructions, where as described earlier, the dispatching and execution of instructions are not necessarily in the order the instructions are issued, i.e. the instructions could be dispatched and executed out-of-order.

Figure 11:
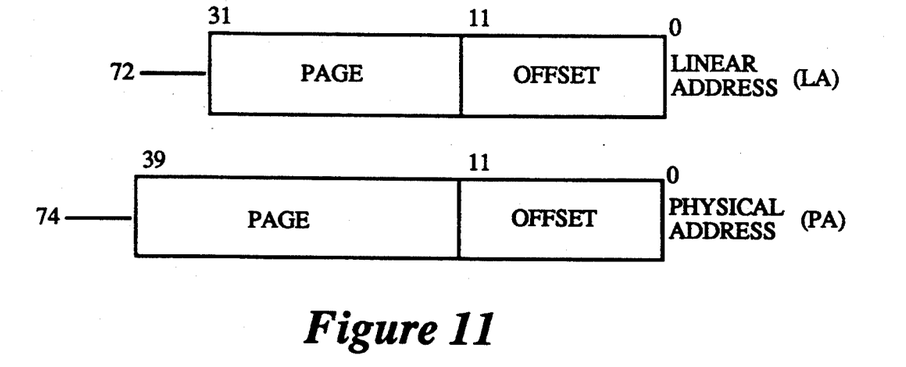
FIG. 11 illustrates one embodiment of linear and physical addresses used by the exemplary computer system of FIG. 1.

The reservation station 26 receives and stores the issued instructions, resolving their operands with data from the IEU 30, the FEU 32, the data cache, the ROB and RRF 36, and hold them until their operands are all resolved. The reservation station 26 then dispatches the op codes and the operands of the instructions to the AGU 28, the IEU 30, the FEU 32, the MIU 34, and the cache controller as appropriate. In particular, a load instruction is dispatched as a single operation, whereas a store instruction is dispatched as a store address (STA) and a store data (STD) operation, to the cache controller and the MIU 34. Similar to instruction fetching, there is also no requirement that the load sources or the store destinations be aligned memory locations. In other words, the load sources of load instructions and store destinations of store instructions may span two cache lines. The AGU 28, the IEU 30, the FEU 32, the MIU 34, and the cache controller in turn perform the operations accordingly. In particular, the AGU 28 generates the appropriate linear addresses. A linear address is computed using a base address, a displacement value, a scale value, an index value, and a segment value. The linear address is 32 bits long with the 20 higher order bits identifying a memory page and the 12 lower order bits identifying the offset into the memory page (see FIG. 11). The execution results of the integer, floating point, and load instructions are held in the ROB 36, and then retired/committed to the RRF 36 in the order these instructions were issued. The speculative execution results of the mispredicted branches held in the ROB 36 are purged upon their detections.

While for ease of understanding, the present invention is being described with the store instruction being dispatched as two operations (STA and STD), and 32 bits linear addresses with page denoting and offset denoting portions being used, based on the descriptions to follow, it will be appreciated that the present invention may be practiced without any of these details.

Figure 3:
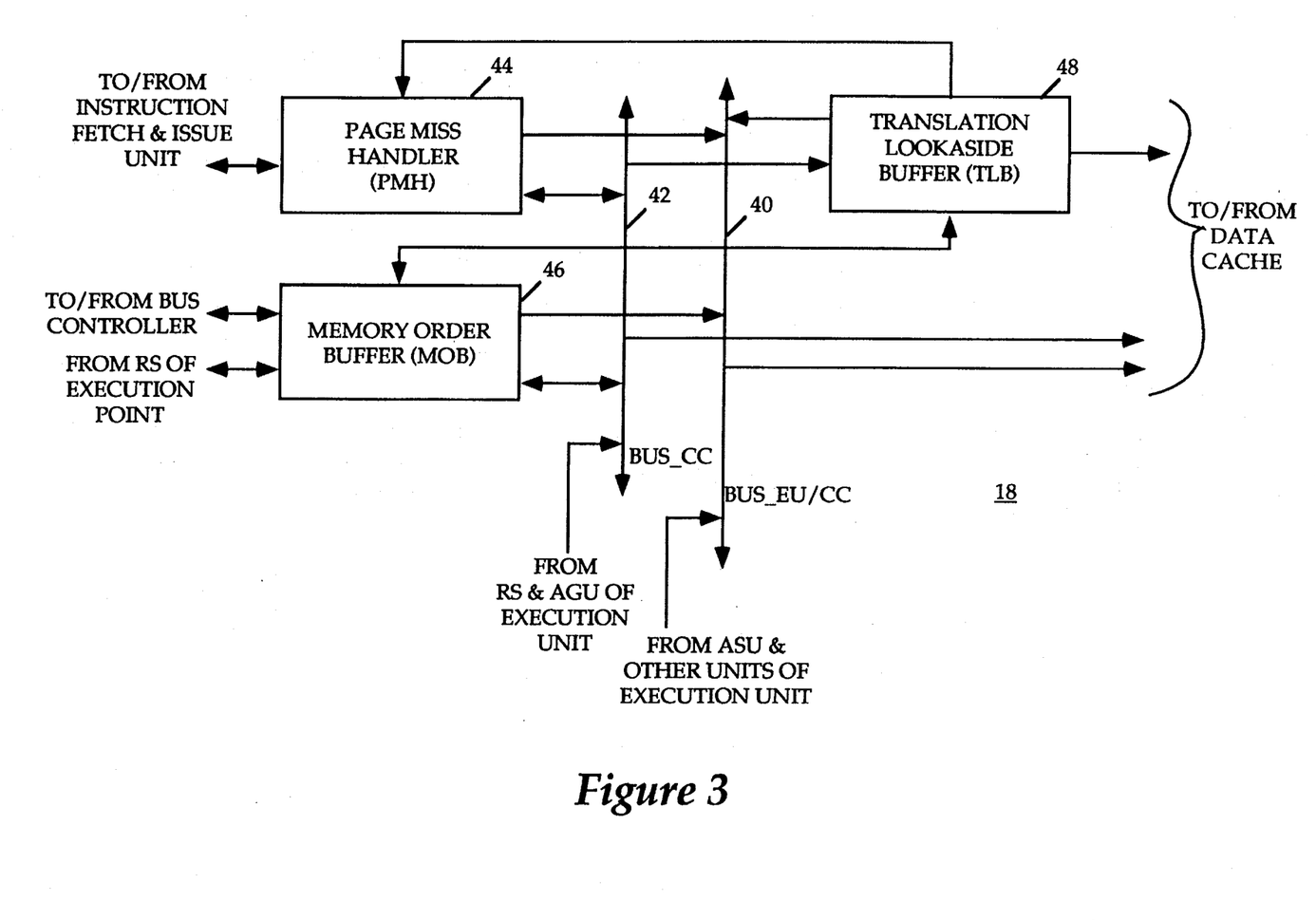
FIG. 3 illustrates the relevant portions of one embodiment of the cache controller of FIG. 1 in further detail.

Referring now to FIG. 3, a block diagram illustrating the relevant portions of one embodiment of the data cache controller of FIG. 1 in further detail is shown. In this embodiment, the data cache controller 18 comprises a page miss handler (PMH) 44, a memory order buffer (MOB) 46, and a translation lookaside buffer (TLB) 48. Additionally, the data cache controller 18 comprises an internal bus (Bus_CC) 42, and the common bus (Bus_EU/CC) 40 shared with the execution unit. These elements 40–48 are coupled with each other as illustrated. Together, they control all accesses (loads and stores) to the data cache and in turn the memory unit of the computer system.

The TLB 48 translates the 32 bits linear addresses into 40 bits physical addresses with 28 higher order bits indicating the memory page and the 12 lower order bits indicating the offset into the memory page (see FIG. 11), and forwards misses to the PMH 44. The PMH 44 in response performs page walking and other well known page miss handling functions. The MOB 46, incorporated with the teachings of the present invention, receives the STA operations, buffers them, and then retires/commits them as appropriate. The MOB 46 then causes the retired/committed stores to be executed in due course in "background" at the convenience of the memory system. Additionally, the MOB 46 responds to load operations forwarding buffered data as necessary. Furthermore, the MOB 46 snoops the source addresses of instruction fetches and generates a single stall signal for the bus controller to stall an instruction fetch whenever the source address of an instruction being fetched substantially matches any of the store addresses of the store destinations of the buffered stored instructions.

The TLB 48 and the PMH 44 are intended to represent a broad category of these elements found in most computer systems. Their functions and constitutions as are well known and will not be further described. The MOB 46 will be described in further detail below with additional references to the remaining figures.

Figure 4:
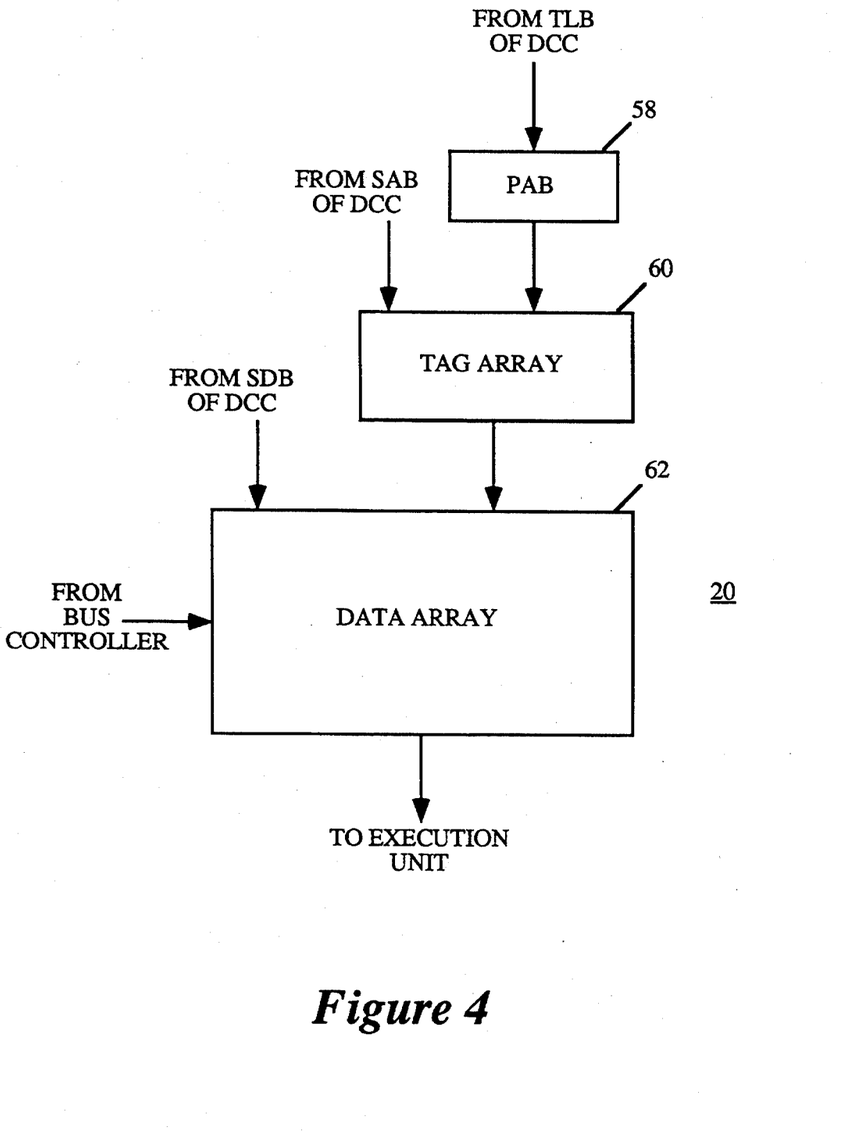
FIG. 4 illustrates the relevant portions of one embodiment of the data cache of FIG. 1 in further detail.

Referring now to FIG. 4, a block diagram illustrating the relevant portions of one embodiment of the data cache of FIG. 1 in further detail is shown. In this embodiment, the data cache 20 comprises a physical address buffer (PAB) 58, a data tag array 60, and a data array 62, coupled to each other as shown. The PAB 58 receives and saves the 28 high order bits of the translated physical addresses from the TLB of the data cache controller for the STA operations, and in cooperation with the MOB of the data cache controller, retires/- commits and executes them as appropriate. The data tag array 60 stores the physical address tags of the data currently being cached in the data array and tag matches the accessing physical addresses against the stored physical address tags. The data array 62 receives and stores the data currently being cached, and responds to data loads. The data tag array 60 and the data array 62 have sufficient capacity for storing 128 sets of 2 way set associative 32 byte cache lines of data and their corresponding address tags. The PAB 58 and its cooperation with the MOB of the data cache controller will be discussed in further detail below. The tag array 60 and the data array 62 are intended to represent a broad category of these elements found in most computer systems, whose functions and constitutions are well known and will not be further described.

Figure 5:
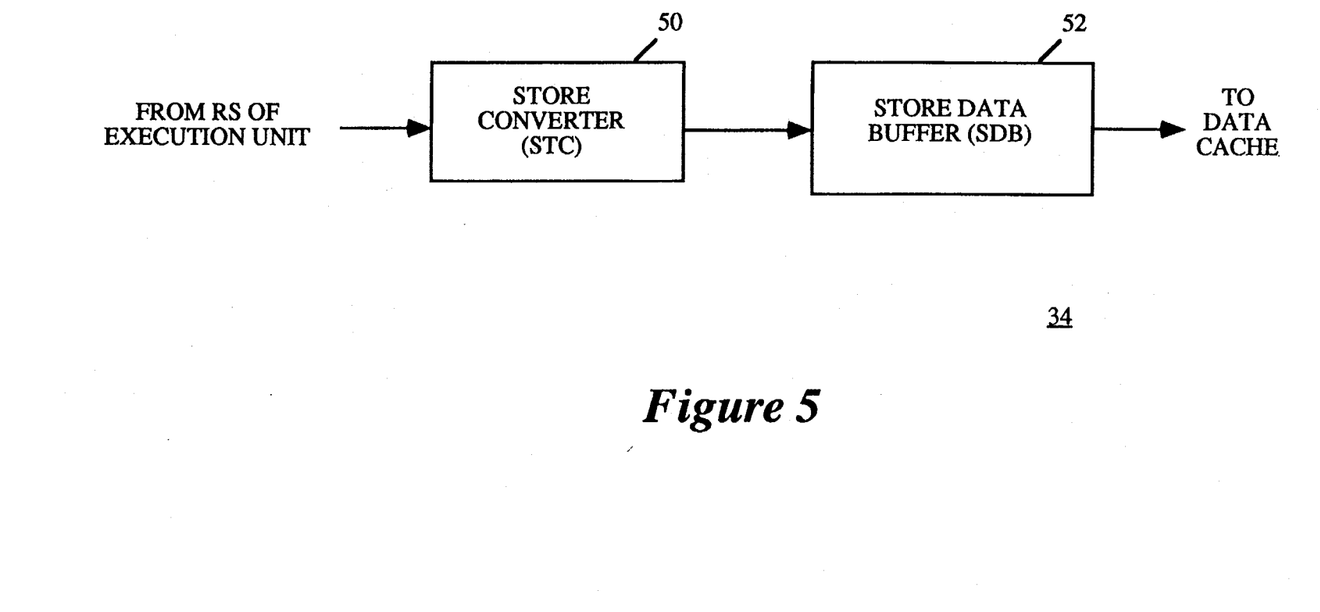
FIG. 5 illustrates the relevant portions of one embodiment of the memory interface unit of FIG. 2 in further detail.

Referring now to FIG. 5, a block diagram illustrating the relevant portions of one embodiment of the MIU of the execution unit of FIG. 2 in further detail is shown. In this embodiment, the MIU 34 comprises a store converter (STC) 50 and a store data buffer (SDB) 52, coupled to each other as shown. The STC 50 converts the floating point data of the STD operations. The SDB 52 receives and stores the STD operations, and in cooperation with the store address buffer (SAB) of the data cache controller, and the PAB of the data cache, retires/commits the STD operations as appropriate, and causes them to be executed. The functions and constitutions of the STC 50 are well known and will not be further ,described. The SDB 52 and its cooperation with the SAB and PAB will be described in further detail below.

Figure 6:
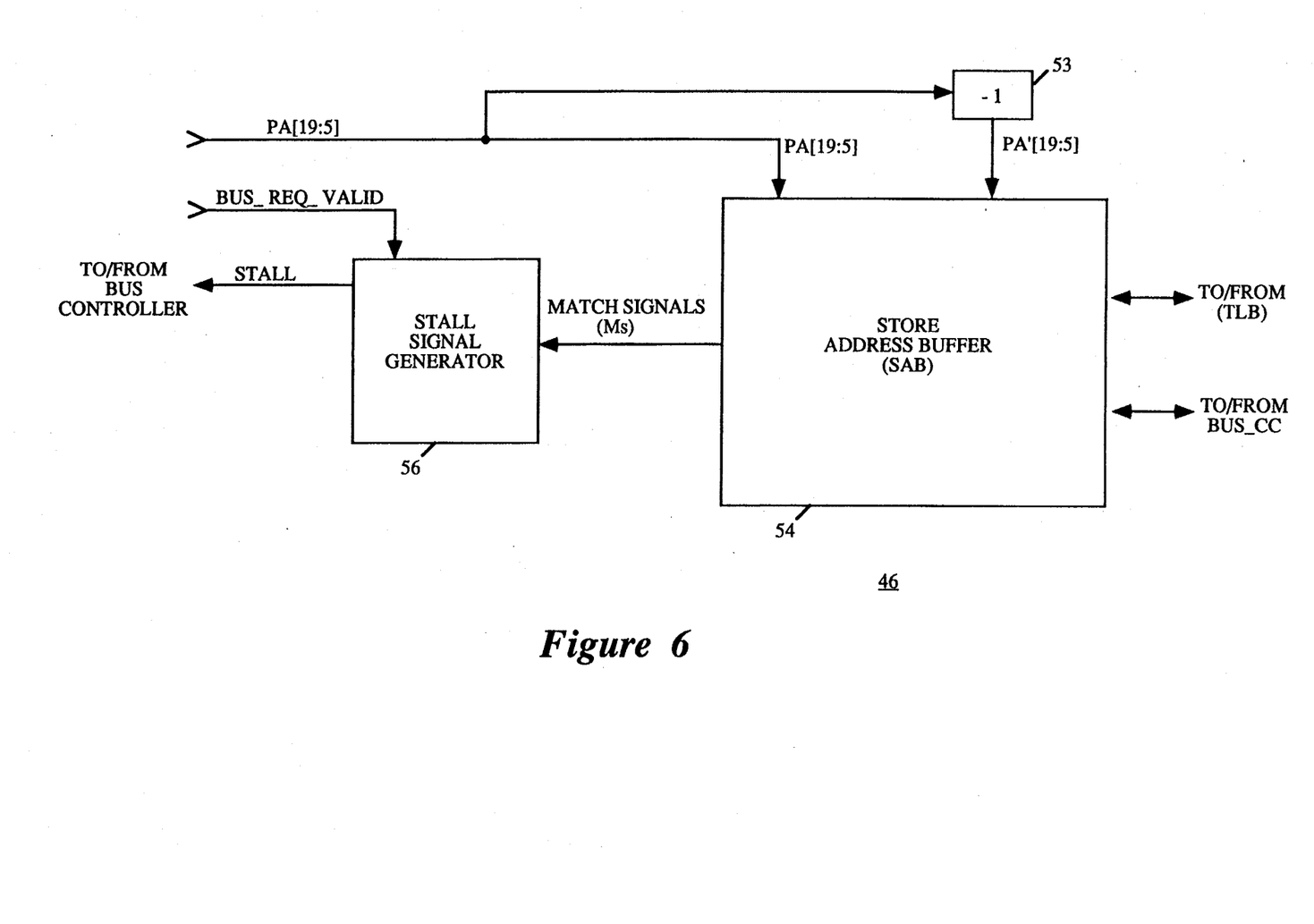
FIG. 6 illustrates the relevant portions of one embodiment of the memory order buffer of FIG. 3 in further detail.

Referring now to FIG. 6, a block diagram illustrating the relevant portions of one: embodiment of the memory order buffer of FIG. 3 in further detail is shown. In this embodiment, the memory order buffer 46 comprises a subtractor 53, a store address buffer (SAB) 54, and a stall signal generator 56, coupled to each other as shown. The subtractor 53 is used to generate modified PA'[19:5] of the instruction's fetch source by subtracting one from PA[19:5] of the instruction's fetch source, which is equivalent to subtracting 32, the cache line size, from the PA of the instruction's fetch source. The SAB 54 is used to store the remaining operands and partial replications of the page denoting portions of the store destination addresses of buffered STA operations. The SAB 54 in cooperation with the SDB of the MIU and the PAB of the data cache, retires/commits the STA operations as appropriate, and causes them to be executed. Additionally, the SAB 54 is used to address match PA[19:5] and PA'[19:5] of an instruction's fetch source against the corresponding address bits of the buffered store destination addresses, and generate a number of matching signals based on the matching results. The stall signal generator 56 is used to generate the stall signal based on the matching signals output by the SAB 54 and the state of the bus request validity signal (Bus_Req_Valid).

The reason both PA[19:5] and PA'[19:5] of the instruction's fetch source are provided to the SAB 54 to determine if the source address of the instruction being fetched is a potential store destination of one of the buffered store instructions to allow for store instructions storing data into memory locations spanning two cache lines. For example, if a store instruction is storing 4 bytes of data starting at physical address X"000003FFFF", and the source address of an instruction fetch is X"0000040000", the mere matching of address bits [19:5] of the store address of the STA operation and the source address of the instruction being fetched, which are equal to "001111111111111" and "010000000000000" respectively, will fail to stall the instruction fetch. However, by matching the address bits [19:5] of the source address of the STA operation and the adjusted source address of the instruction being fetched, which are both equal to "001111111111111", after subtracting "1" from "010000000000000", the instruction fetch will be properly stalled.

While the present invention is being described with an embodiment using only address bits [19:5] of the various addresses to generate the stall signal, it will be appreciated that the present invention may be practiced using any number of address bits. Obviously, when only some of the address bits are used, it reduces the amount of hardware and real estate requirement, however, some amounts of unnecessary stalling will occur. On the other hand, the more number of address bits are used, the fewer the amounts of unnecessary stalling will result, however, more hardware and real estate will be required. Experience has shown that using 15 address bits, i.e. bits [19:5] provide an optimum tradeoff between unnecessary stalling and hardware cost.

The subtractor 53 is well known in the art and will not be further described. The: SAB 54 and the stall signal generator 56 will be described in further detail below with additional references to the remaining figures.

Figure 7:
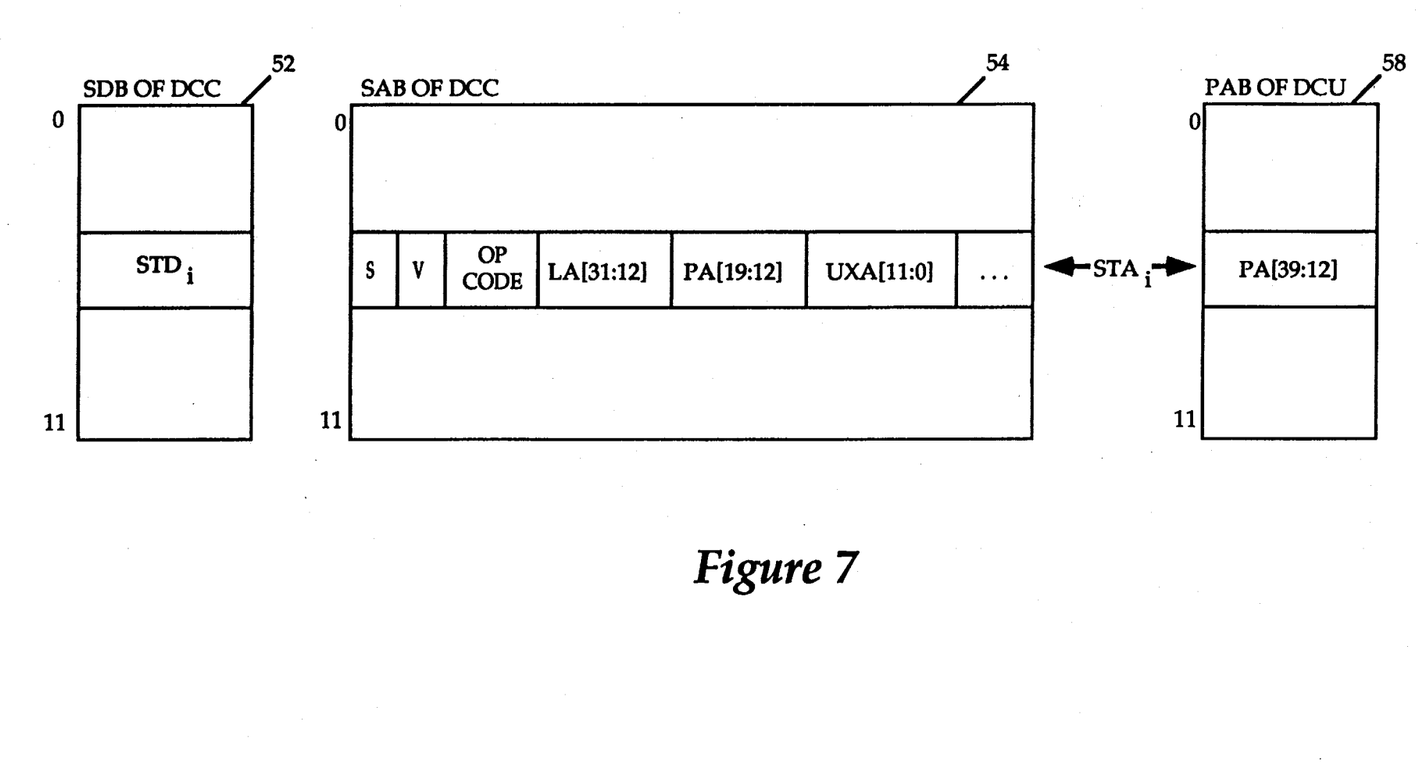
FIG. 7 illustrates the correspondence between the physical address buffer (PAB) of FIG. 4, the store data buffer (SDB) of FIG. 5, and the store address buffer (SAB) of FIG. 6.

Referring now to FIG. 7, a block diagram illustrating the correspondence between the PAB of FIG. 4, the SDB of FIG. 5, and the SAB of FIG. 6 is shown. The PAB 58, the SDB 52, and the SAB 54, all comprise equal number of buffer slots; in this embodiment, up to a maximum of 12 buffer slots. The STD and STA operations of a store instruction are stored in corresponding buffer slots of the PAB 58, SDB 52, and SAB 54. More specifically, the 28 high order bits of the physical address (PA[39:12]) are stored in a buffer slot in the PAB 58. The STD operation is stored in a corresponding buffer slot in the SDB 52. The STA operation, including the split bit (s), the valid bit (v), the op code, the 20 high order bits of the linear address (LA[31:12]), and the 12 page offset designating bits of the address (UXA[11:0]), is stored in a corresponding buffer slot in the SAB 54. The s bit, when set, indicates that the STA operation is being performed against memory locations spanning multiple cache lines. Additionally, the 8 lower order bits of the page designating portion of the physical address (PA[19:12]) of an STA operation are replicated in the buffer slot in the SAB 54.

The STD and STA operations of most store instructions are promoted to a "senior" state, i.e. ready for retirement or commitment, in due course, when their respective preceding instructions have been retired/committed or promoted to the "senior" state. The "senior" STD and STA operations are then executed in the "background" in due course when the data cache is free, and then purged from the SDB 52, the SAB 54, and the PAB 58. The STD and STA operations of some of the store instructions, such as those storing data to memory locations mapped to I/O devices, are not eligible to be promoted to the "senior" state. The STD and STA operations of these store instructions are retired/committed, and purged from the SDB 52, the SAB 54, and the PAB 58 concurrent with their executions, e.g. when the target I/O devices are ready to accept the data being "stored". In this embodiment, the linear addresses are driven from the SAB 54 to the TLB again, and the newly generated PA is directly provided to the tag array of the data cache, bypassing the PAB of the data cache. Additionally, if a store instruction involves storing data to memory locations spanning two cache lines, the data cache controller signals the data cache, and the STD and STA operations are driven to the data cache twice, with the data size and the physical address being adjusted accordingly the second time.

While the present invention is being described with a store instruction being dispatched as a STD and a STA operation, and the store operands are buffered in separate buffers disposed in different components of the system, it will be appreciated that the present invention may be practiced with the store instruction being dispatched as one or more operations, and with the store operands being buffered in one or more buffers, with or without a subset of the page denoting portion of the store address replicated.

Figure 8:
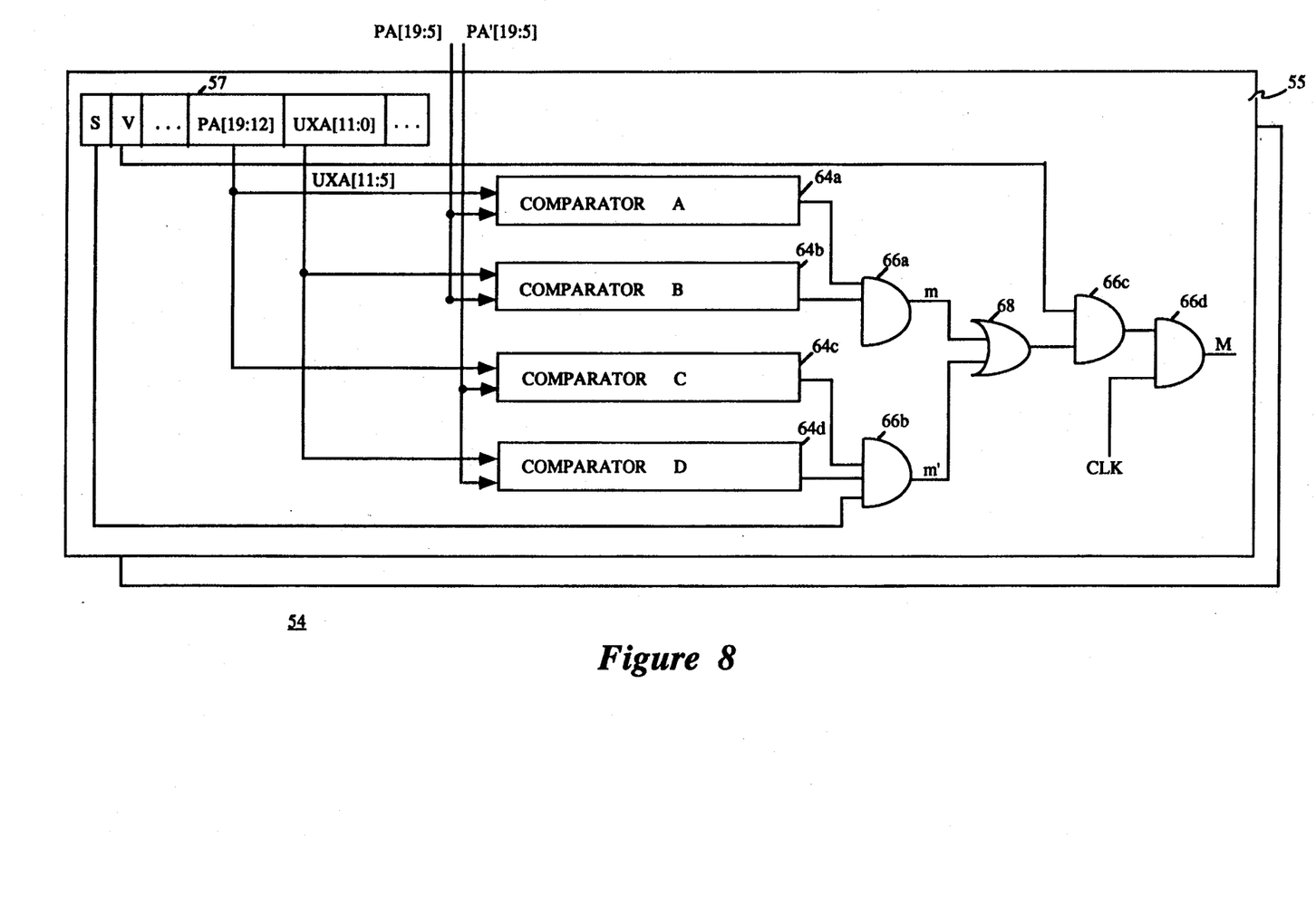
FIG. 8 illustrates the relevant portions of one embodiment of the SAB of FIG. 6 in further detail.

Referring now to FIG. 8, a block diagram illustrating the relevant portions of one embodiment of the SAB of FIG. 6 in further detail is shown. As illustrated, each buffer slot 55 is integrated with an identical matching circuit comprising a number of comparators 64a-64d and gates 66a-66d and 68, coupled to each other as shown. More specifically, each buffer slot 55 is integrated with four comparators 64a-64d, four AND gates 66a-66d, and an OR gate 68. The first and second comparators 64a-64b are used to match PA[19:12] and UX-A[11:5] of the store address of the buffered STA operation against PA[19:5] of the source address of the instruction being fetched. The third and fourth comparators 64a-64b are used to match PA[19:12] and UX-A[11:5] of the store address of the buffered STA operation against PA'[19:5] of the source address of the instruction being fetched. The first and second AND gates 66a-66b are used to generate a first and a second match signal (m and m') based on the logical AND of the outputs of the first and second, and third and fourth comparators respectively. The generation of m' is further based on the split bit (s). The OR gate 68 is used to generate a combined match signal based on the logical OR of the outputs of the first and second AND gates 66a-66b. The third AND gate 66c is used to generate a qualified combined match signal based on the logical AND of the output of the OR gate 68 and the state of the validity bit (v) of the buffered STA operation. Lastly, the fourth AND gate 66d is used to generate a time aligned and qualified combined match signal (M) based on the logical AND of the qualified combined match signal and the clock pulse.

Figure 9A:
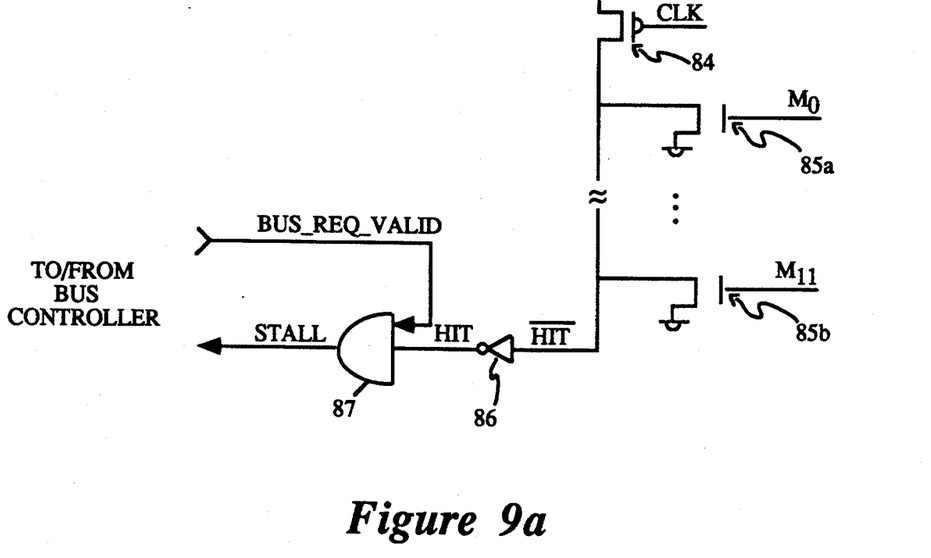
FIGS. 9a–9b illustrate the relevant portions and timing of one embodiment of the stall signal generator of FIG. 6 in further detail.
Figure 9B:
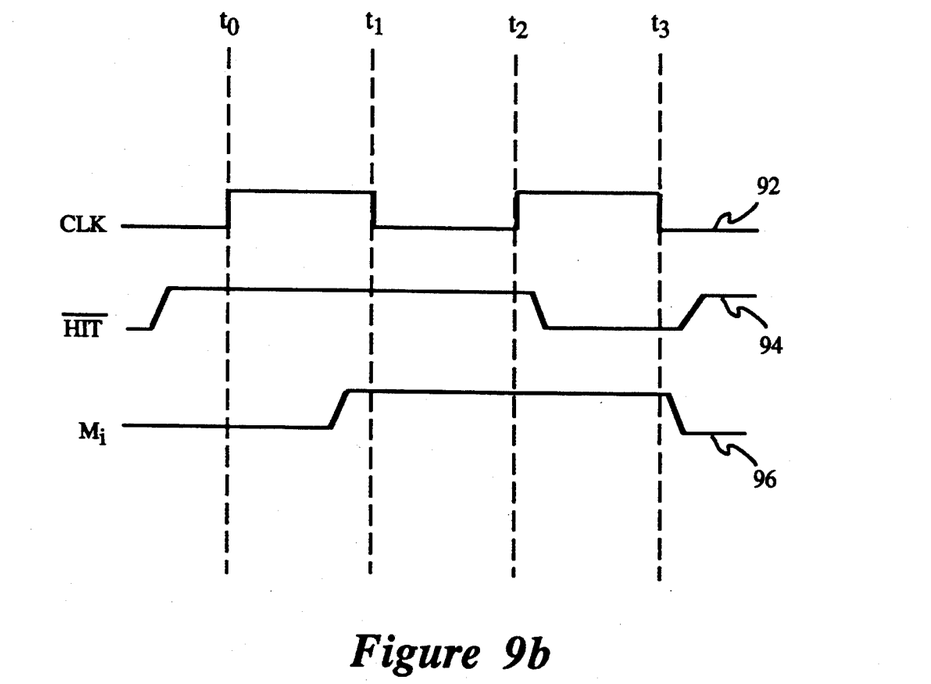

Referring now to FIGS. 9a-9b, two diagrams illustrating the relevant portions and timing of one embodiment of the stall signal generator of FIG. 6 in further detail is shown. As illustrated in FIG. 9a, in this embodiment, the stall signal generator 56 comprises a precharged bit line 84, a set of transistors 85a-85k, an inverter 86, and an AND gate 87, coupled to each other as shown. The transistors 85a-85k are correspondingly coupled to the matching circuits of the SAB, and the AND gate 87 is coupled to the bus controller. The pre-charged bit line 84 outputs a HIT_n signal for the inverter 86, which in turn provides a HIT signal for the AND gate 87. The AND gate 87 also receives the bus request validity signal (Bus_Req_Valid) from the bus controller as input, and in response, generates the stall signal based on the states of the HIT and Bus_Req_Valid signals.

As illustrated in FIG. 9b, the HIT_n signal is normally in a high state, and it is pulled low when one or more of the time aligned and qualified combined match signals goes high. As the HIT_n signal goes low, the HIT signal goes high, resulting in the output of the AND gate 87 going high, if the Bus_Req_Valid signal is also in a high state, thereby generating the stall signal.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a memory unit for storing instructions and data, a bus controller coupled to said memory unit for accessing said instructions and data, an instruction fetching and issuing unit coupled to said bus controller for fetching and issuing said instructions in order, an execution unit coupled to said instruction fetching and issuing unit for executing said issued instructions, and a cache subsystem coupled to said bus controller and said execution unit for caching said data, wherein said instructions are fetched, issued, and executed in a manner with said instruction fetching and issuing potentially being speculative, an apparatus for buffering store instructions, and preventing incorrect fetching of an instruction of a self-modifying code sequence with dependency on a buffered store instruction, said apparatus comprising:
   a) buffer means for buffering a plurality of store instructions including partial address bits of destination addresses of the buffered store instructions;
   b) address input means coupled to said instruction fetching and issuing unit for receiving a first plurality of partial address bits of a source address of an instruction being fetched, and outputting a second plurality of partial address bits and the first plurality of partial address bits of said source address, the second plurality of partial address bits being computed based on the first plurality of partial address bits;
   c) matching means coupled to said buffer means and said address input means for receiving said first and second plurality of partial address bits of said source address, concurrently matching said first and second plurality of partial address bits of said source address against said stored partial address bits of said destination addresses of said buffered store instructions, and generating a match signal for each buffered store instruction whose stored partial address bits of its destination address match either said first or second plurality of partial address bits of said source address;
   d) stalling means coupled to said matching means and said bus controller for generating a stall signal in response to receiving at least one match signal, to stall said bus controller, thereby preventing said instruction from being incorrectly fetched.

2. The apparatus as set forth in claim 1, wherein, each of said buffered store instructions potentially stores data into destinations spanning two cache lines of said cache subsystem, each cache line having a fixed cache line size;

said address input means comprises subtraction means for computing said second plurality of partial address bits of said source address by subtracting a constant from said first plurality of partial address bits of said source address, said constant being predetermined based on said fixed cache line size.

3. The apparatus as set forth in claim 2, wherein, each of said source and destination addresses has address bits (n1:0), where n1 is an integer and greater than 0;

said buffer means stores only address bits (n2:n3) of the destination address of the store destination of each buffered store instruction, where n2 is an integer and not larger than n1, and n3 is an integer and smaller than n2 but not smaller than 0;

said subtraction means receives first address bits (n4:n5) of said source address of said instruction being fetched, and generates second address bits (n4:n5) of said source address by subtracting said predetermined constant from said first address bits (n4:n5), where n4 is an integer not larger than n2, and n5 is an integer smaller than n4 but not smaller than n3;

said matching means receives said first and second address bits (n4:n5) of said source address, and concurrently matches said first address bits (n4:n5) and said second address bits (n4:n5) of said source address against the address bits (n4:n5) of the destination addresses of the buffered store instructions.

4. The apparatus as set forth in claim 6, wherein, address bits (n1:n6) of each of said source and destination addresses denote a memory page, and address bits (n7:0) denotes an offset into the memory page, where n6 and n7 are integers, and n1>n6>n7>0;

n2 is less than n1 but greater than n6;

n3 equals 0;

n4 equals, n2; and n5 is less than n7 but greater than 0.

5. The apparatus as set forth in claim 4, wherein, said buffer means comprises a plurality of buffer slots for storing said buffered store instructions; and said matching means comprises a plurality of matching circuits correspondingly coupled to said buffer slots, each of said matching circuit comprising:

c.1) a first comparator for receiving address bits (n4:n6) of said first address bits (n4:n5) of said source address and partial address bits (n4:n6) of the destination address of the store instruction buffered in the corresponding buffer slot as first inputs, comparing said first inputs, and outputting a first partial match signal if said first inputs match each other;

c.2) a second comparator for receiving address bits (n7:n5) of said first address bits (n4:n5) of said source address and partial address bits (n7:n5) of the destination address of the store instruction buffered in the corresponding buffer slot as second inputs, comparing said second inputs, and outputting a second partial match signal if said second inputs match each other;

c.3) a first AND gate coupled to said first and second comparators for receiving said first and second partial match signals, and outputting the logical AND of said first and second partial match signals as a first preliminary match signal;

c.4) a third comparator for receiving address bits (n4:n6) of said second address bits (n4:n5) of said source address and partial address bits (n4:n6) of the destination address of the store instruction buffered in the corresponding buffer slot as third inputs, comparing said third inputs, and outputting a third partial match signal if said third inputs match each other;

c.5) a fourth comparator for receiving address bits (n7:n5) of said second address bits (n4:n5) of said source address and partial address bits (n7:n5) of the destination address of the store instruction buffered in the corresponding buffer slot as fourth inputs, comparing said fourth inputs, and outputting a fourth partial match signal if said fourth inputs match each other;

c.6) a second AND gate coupled to said third and fourth comparators for receiving said third and fourth partial match signals, and a split bit indicating whether the destination of the store instruction buffered in the corresponding buffer slot spans two cache lines, and outputting the logical AND of said third and fourth partial match signals and said split bit as a second preliminary match signal;

c.7) an OR gate coupled to said first and second AND gates for receiving said first and second preliminary match signals, and outputting the logical OR of said first and second preliminary match signals as a combined preliminary match signal;

c.8) a third AND gate coupled to said OR gate for receiving said combined preliminary match signal and a validity bit indicating whether the destination address of the store instruction buffered in the corresponding buffer slot is valid or not, and outputting the logical AND of said combined preliminary match signal and said validity bit as a qualified match signal; and c.9) a fourth AND gate coupled to said third AND gate for receiving said qualified match signal and a clock signal, and output the logical AND of said qualified match signal and said clock signal as one of said match signals.

6. The apparatus as set forth in claim 1, wherein, said stalling means comprises:

d.1) a pre-charged bit line coupled to said matching means for generating an active low signal in response to receiving at least one match signal;

d.2) an inverter coupled to said pre-charged bit line for generating an active high signal in response to said active low signal, and d.3) an AND gate coupled to said inverter and said bus controller for receiving said active high signal and a validity signal indicating whether said instruction fetch is valid or not, and generating the logical AND of said active high and validity signals as a stall signal.

7. The apparatus as set forth in claim 1, wherein, said execution unit potentially executes said issued instructions out-of-order but retires execution results in order; and said buffer means, said address input means, said matching means and said stalling means are disposed in a memory order buffer of a data cache controller of said cache subsystem.

8. In a computer system comprising a memory unit for storing instructions and data, a bus controller coupled to said memory unit for accessing said instructions and data, an instruction fetching and issuing unit coupled to said bus controller for fetching and issuing said instructions in order, an execution unit coupled to said instruction fetching and issuing unit for executing said issued instructions, and a cache subsystem coupled to said bus controller and said execution unit for caching said data, wherein said instructions are fetched, issued, and executed in a manner with said instruction fetching and issuing potentially being speculative, a method for buffering store instructions, and preventing incorrect fetching of an instruction of a self-modifying code sequence with dependency on a buffered store instruction, said method comprising the steps of:

a) storing partial address bits of destination addresses of store destinations of a plurality of buffered store instructions;

b) receiving a first plurality of partial address bits of a source address of an instruction being fetched, computing a second plurality of partial address bits of the source address based on the first plurality of partial address bits of the source address, and outputting the first and second plurality of partial address bits of said source address;

c) concurrently matching said first and second plurality of partial address bits of said source address against the corresponding partial address bits of said destination addresses, and generating a match signal for each buffered store instruction whose stored partial address bits of its destination address match either said first or second plurality of partial address bits of said source address; and     d) generating a stall signal in response to receiving at least one match signal, to stall said fetching of said instruction, thereby preventing said instruction from being incorrectly fetched.

9. The method as set forth in claim 8, wherein, each of said buffered store instructions potentially stores data into destinations spanning two cache lines of said cache subsystem, each cache line having a fixed cache line size;

said step (b) comprises generating said second plurality of partial address bits of said source address by subtracting a constant from said first plurality of partial address bits of said source address, said constant being predetermined based on said fixed cache line size.

10. The method as set forth in claim 9, wherein, each of said source and destination addresses has address bits ($n_1:0$), where $n_1$ is an integer greater than 0;

said step (a) comprises storing only address bits ($n_2:n_3$) of the destination address of the store destination of each buffered store instruction, where $n_2$ is an integer not larger than $n_1$, and $n_3$ is an integer smaller than $n_2$ but not smaller than 0, said step (b) comprises receiving first address bits ($n_4:n_5$) of said source address of said instruction being fetched, and generating second address bits ($n_4:n_5$) by subtracting said predetermined constant from said first address bits ($n_4:n_5$), where $n_4$ is an integer not larger than $n_2$, and $n_5$ is an integer smaller than $n_4$ but not smaller than $n_3$;

said step (c) comprises receiving said first address bits ($n_4:n_5$) and said second address bits ($n_4:n_5$) of said source address, and concurrently matching said first address bits ($n_4:n_5$) and said second address bits ($n_4:n_5$) of said source address against the address bits ($n_4:n_5$) of the destination addresses of the buffered store instructions.

11. The method as set forth in claim 10, wherein, address bits ($n_1:n_6$) of each of said source and destination addresses denote a memory page, and address bits ($n_7:0$) denotes an offset into the memory page, where $n_6$ and $n_7$ are integers, and $n_1 > n_6 > n_7 > 0$;

$n_2$ is less than $n_1$ but greater than $n_6$;

$n_3$ equals 0;

$n_4$ equals $n_2$; and $n_5$ is less than $n_7$ but greater than 0.

12. In a computer system comprising a memory unit for storing instructions and data, a bus controller coupled to said memory unit for accessing said instructions and data, an instruction fetching and issuing unit coupled to said bus controller for fetching and issuing said instructions in order, an execution unit coupled to said instruction fetching and issuing unit for executing said issued instructions, and a cache subsystem coupled to said bus controller and said execution unit for caching said data, wherein said instructions are fetched, issued, and executed in a manner with said instruction fetching and issuing potentially being speculative, an apparatus for buffering store instructions, and preventing incorrect fetching of an instruction of a self-modifying code sequence with dependency on a buffered store instruction, said apparatus comprising:

a) buffers for buffering a plurality of store instructions including partial address bits of destination addresses of the buffered store instructions;

b) address input unit coupled to said instruction fetching and issuing unit for receiving a first plurality of partial address bits of a source address of an instruction being fetched, and outputting a second plurality of partial address bits and the first plurality of partial address bits of said source address, said second plurality of partial address bits being computed based on said first plurality of partial address bits;

c) matching circuitry coupled to said buffers and said address input unit for receiving said first and second plurality of partial address bits of said source address, concurrently matching said first and second plurality of partial address bits of said source address against said stored partial address bits of said destination addresses of said buffered store instructions, and generating a match signal for each buffered store instruction whose stored partial address bits of its destination address match either said first plurality of partial address bits or said second plurality of partial address bits of said source address;

d) a stall signal generator coupled to said matching circuitry and said bus controller for generating a stall signal in response to receiving at least one match signal, to stall said bus controller, thereby preventing said instruction from being incorrectly fetched.

13. The apparatus as set forth in claim 12, wherein, each of said buffered store instruction potentially stores data into destinations spanning two cache lines of said cache subsystems, each cache line having a fixed cache line size;

said address input unit comprises a subtractor for generating said second plurality of partial address bits of said source address by subtracting a constant from said first plurality of partial address bits of said source address, said constant being predetermined based on said fixed cache line size.

14. The apparatus as set forth in claim 13, wherein, each of said source and destination addresses has address bits ($n_1:0$), where $n_1$ is an integer greater than 0;

each of said buffers stores only address bits (n2:n3) of the destination address of the store destination of each buffered store instruction, where n2 is an integer not larger than n1, and n3 is an integer smaller than n2 but not smaller than 0;

said subtractor receives first address bits (n4:n5) of said source address of said instruction being fetched, and generates second address bits (n4:n5) by subtracting said predetermined constant from said first address bits (n4:n5), where n4 is an integer not larger than n2, and n5 is an integer smaller than n4 but not smaller than n3;

said matching circuitry receives said first and second address bits (n4:n5) of said source address, and concurrently matches said first and second address bits (n4:n5) of said source address against the address bits (n4:n5) of the destination addresses of the buffered store instructions.

15. The apparatus as set forth in claim 14, wherein, address bits (n1:n6) of each of said source and destination addresses denote a memory page, and address bits (n7:0) denotes an offset into the memory page, where n6 and n7 are integers, and n1>n6>n7>0;
n2 is less than n1 but greater than n6;
n3 equal 0;
n4 equals n2; and
n5 is less than n7 but greater than 0.

16. The apparatus as set forth in claim 15, wherein, said buffers comprise a plurality of buffer slots of storing said buffered store instructions; and
said matching circuitry comprises a plurality of matching circuits correspondingly coupled to said buffer slots, each of said matching circuit comprising:

c.1) a first comparator for receiving first partial address bits (n4:n6) of said first address bits (n4:n5) of said source address and partial address bits (n4:n6) of the destination address of the store instruction buffered in the corresponding buffer slot as first inputs, comparing said first inputs, and outputting a first partial match signal if said first inputs match each other;

c.2.) a second comparator for receiving first partial address bits (n7:n5) of said first address bits (n4:n5) of said source address and partial address bits (n7:n5) of the destination address of the store instruction buffered in the corresponding buffer slot as second inputs, comparing said second inputs, and outputting a second partial match signal if said second inputs match each other;

c.3) a first AND gate coupled to said first and second comparators for receiving said first and second partial match signals, and outputting the logical AND of said first and second partial match signals as a first preliminary match signal;

c.4) a third comparator for receiving second partial address bits (n4:n6) of said second address bits (n4:n5) of said source address and partial address bits (n4:n6) of the destination address of the store instruction buffered in the corresponding buffer slot as third inputs, comparing said third inputs, and outputting a third partial match signal if said third inputs match each other;

c.5) a fourth comparator for receiving second partial address bits (n7:n5) of said second address bits (n4:n5) of said source address and partial address bits (n7:n5) of the destination address of the store instruction buffered in the .corresponding buffer slot as fourth inputs, comparing said fourth inputs, and outputting a fourth partial match signal if said fourth inputs match each other;

c.6) a second AND gate coupled to said third and fourth comparators for receiving said third and fourth partial match signals, and a split bit indicating whether the destination of the store instruction buffered in the corresponding buffer slot spans two cache lines, and outputting the logical AND of said third and fourth partial match signals and said split bit as a second preliminary match signal;

c.7) an OR gate coupled to said first and second AND gates for receiving said first and second preliminary match signals, and outputting the logical OR of said first and second preliminary match signals as a combined preliminary match signal;

c.8) a third AND gate coupled to said OR gate for receiving said combined preliminary match signal and a validity bit indicating whether the destination address of the store instruction buffered in the corresponding buffer slot is valid or not, and outputting the logical AND of said combined preliminary match signal and said validity bit as a qualified match signal; and c.9) a fourth AND gate coupled to said third AND gate for receiving said qualified match signal and a clock signal, and output the logical AND of said qualified match signal and said clock signal as one of said match signals.

17. The apparatus as set forth in claim 12, wherein, said stall signal generator comprises:

d.1) a pre-charged bit line coupled to said matching circuitry for generating an active low signal in response to receiving at least one match signal;

d.2) an inverter coupled to said pre-charged bit line for generating an active high signal in response to said active low signal, and d.3) an AND gate coupled to said inverter and said bus controller for receiving said active high signal and a validity signal indicating whether said instruction fetch is valid or not, and generating the logical AND of said active high and validity signals as a stall signal.

18. The apparatus as set forth in claim 12, wherein, said execution unit potentially executes said issued instructions out-of-order but retires execution results in order; and
said buffers, said address input unit, said matching circuitry, and said stall signal generator are disposed in a memory order buffer of a data cache controller of said cache subsystem.

19. A computer system comprising:
(a) a memory unit for storing instructions and data;
(b) a bus, controller coupled to said memory unit for accessing said instructions and data;
(c) an instruction fetching and issuing unit coupled to said bus controller for fetching and issuing said instructions in order, said instruction fetching and issuing potentially being speculative,
(d) an execution unit coupled to said instruction fetching and issuing unit for executing said issued instructions;
(e) a cache subsystem coupled to said bus controller and said execution unit for caching said data, said cache subsystem comprising:
e.1) buffers for buffering a plurality of store instructions including partial address bits of destination addresses of the buffered store instructions;

e.2) address input unit coupled to said instruction fetching and issuing unit for receiving a first plurality partial address bits of a source address of an instruction being fetched, and outputting a second plurality of partial address bits and the first plurality partial address bits of said source address, the second plurality of partial address bits being computed based on said first plurality of partial address bits;

e.3) matching circuitry coupled to said buffers and said address input unit for receiving said first and second plurality of partial address bits of said source address, concurrently matching said first and second plurality of partial address bits of said source address against said stored partial address bits of said destination addresses of said buffered store instructions, and generating a match signal for each buffered store instruction whose stored partial address bits of its destination address match either said first or said second plurality of partial address bits of said source address;

e.4) a stall signal generator coupled to said matching circuitry and said bus controller for generating a stall signal in response to receiving at least one match signal, to stall said bus controller, thereby preventing said instruction from being incorrectly fetched.

20. The computer system as set forth in claim 19, wherein, said execution unit potentially executes said issued instructions out-of-order but retires execution results in order; and said buffers, said address input unit, said matching circuitry and said stall signal generator are disposed in a memory order buffer of a data cache controller of said cache subsystem.

21. The apparatus as set forth in claim 1, wherein, said bus controller, said instruction fetching and issuing unit, said execution unit, said cache subsystem, and said apparatus comprising buffer means, said address input means, said matching means and stalling means, are disposed on a single silicon microprocessor chip.

22. The method as set forth in claim 8, wherein, said bus controller, said instruction fetching and issuing unit, said execution unit, and said cache subsystems, are disposed on a single silicon based microprocessor chip; and said method steps (a) through (c) are practiced on said microprocessor.

23. The apparatus as set forth in claim 12, wherein, said bus controller, said instruction fetching and issuing unit, said execution unit, said cache subsystem, and said apparatus comprising buffers, said address input unit, said matching circuitry, and stalling means, are disposed on a single silicon microprocessor chip.

24. The computer system as set forth in claim 19, wherein, said bus controller, said instruction fetching and issuing unit, said execution unit, said cache subsystem, and said apparatus comprising buffers, said address input unit, said matching circuitry and stalling means, are disposed on a single silicon microprocessor chip.

* * * * *